(12) United States Patent
Shan et al.

(10) Patent No.: US 7,862,179 B2
(45) Date of Patent: Jan. 4, 2011

(54) DUAL-MODE PROJECTION APPARATUS AND METHOD FOR LOCATING A LIGHT SPOT IN A PROJECTED IMAGE

(75) Inventors: Jizhang Shan, Cupertino, CA (US); Jin Li, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 518 days.

(21) Appl. No.: 11/936,746

(22) Filed: Nov. 7, 2007

(65) Prior Publication Data
US 2009/0115971 A1 May 7, 2009

(51) Int. Cl.
*G03B 21/00* (2006.01)

(52) U.S. Cl. ............................ 353/42; 353/30; 353/69; 353/70; 353/119; 353/122; 348/180; 348/181; 348/183; 348/211.99; 348/211.14; 349/5; 349/7; 349/12; 349/16; 349/58; 349/61; 349/62; 349/63; 349/64; 349/65; 345/156

(58) Field of Classification Search ............... 353/30, 353/42, 69, 70, 46, 119, 122; 348/180, 181, 348/182, 183, 211.99, 211.14; 349/5, 7, 349/12, 16, 58, 61, 62, 63, 64, 65; 345/156
See application file for complete search history.

(56) References Cited

U.S. PATENT DOCUMENTS

| 6,050,690 A * | 4/2000 | Shaffer et al. ............. 353/122 |
| 6,275,214 B1 * | 8/2001 | Hansen ........................ 345/158 |
| 6,417,840 B1 | 7/2002 | Daniels |
| 6,802,611 B2 * | 10/2004 | Chu et al. ..................... 353/28 |
| 6,948,820 B2 * | 9/2005 | Veligdan et al. .............. 353/38 |
| 7,180,510 B2 | 2/2007 | Inoue et al. |
| 7,520,620 B2 * | 4/2009 | Miyasaka .................... 353/69 |
| 2004/0012565 A1 | 1/2004 | Cok |
| 2004/0165154 A1 * | 8/2004 | Kobori et al. ................ 353/69 |
| 2006/0170874 A1 | 8/2006 | Yumiki et al. |
| 2006/0197756 A1 | 9/2006 | Sun |
| 2006/0227107 A1 | 10/2006 | Ho |
| 2007/0030460 A1 | 2/2007 | Mehrl |
| 2009/0091710 A1 * | 4/2009 | Huebner ....................... 353/28 |
| 2009/0115722 A1 | 5/2009 | Shan et al. |

FOREIGN PATENT DOCUMENTS

| JP | 2000276297 | 10/2000 |
| WO | 2006085580 A1 | 8/2006 |

OTHER PUBLICATIONS

International Search Report and Written Opinion issued in related PCT Patent Application Serial No. PCT/US2008/080902, issued Jun. 23, 2009, 11 pages.

* cited by examiner

*Primary Examiner*—Georgia Y Epps
*Assistant Examiner*—Sultan Chowdhury
(74) *Attorney, Agent, or Firm*—Lathrop & Gage LLP (57) ABSTRACT

A dual-mode projection apparatus has a projection module for projecting an image onto a projection surface. An image sensor module captures images of the projection surface and determines spatial and temporal characteristics of a visible light spot superimposed on the projection surface. A communications module transmits the spatial and temporal characteristics of the visible light spot to a remote device for remote control of the device based on the spatial and temporal characteristics of the visible light spot.

25 Claims, 12 Drawing Sheets

DUAL-MODE PROJECTION APPARATUS AND METHOD FOR LOCATING A LIGHT SPOT IN A PROJECTED IMAGE

CROSS-REFERENCE TO RELATED APPLICATIONS

This application is related to commonly owned U.S. patent application Ser. No. 11/936,737, entitled "Apparatus and Method for Tracking a Light Pointer" and filed Nov. 7, 2007, the contents of which are hereby incorporated by reference.

BRIEF DESCRIPTION OF THE INVENTION

This invention relates generally to digital image projectors for projecting a digital image onto a display screen. More particularly, this invention relates to a dual-mode projection apparatus and method capable of both projecting and capturing an image for locating a light spot in the projected image.

BACKGROUND OF THE INVENTION

Digital image projectors are devices that project digital images onto a projection surface for presentation to an audience. The digital images are generated at a personal computer or other image source devices connected to a projector, such as DVD players, DVRs, VCRs, satellite receivers, cable systems, and video game players, among others. The projection surface may be a display screen, wall, or other surface in which projected images become visible to the audience.

There are several digital image projectors available today, including Liquid Crystal Display ("LCD") projectors, Digital Light Processing ("DLP") projectors, and Liquid Crystal on Silicon ("LCoS") projectors, among others. These digital image projectors are typically used to project images onto large display screens for viewing by large audiences, such as during presentations at meetings, lectures, conferences, home theater screenings, and other venues requiring large display areas.

A desirable feature during these presentations is to have a presenter or member of the audience draw attention to particular locations or items of interest on the projection surface, such as, for example, by using a laser pointer. Laser pointers are handheld, pen-shaped devices that project a laser beam onto a surface area to generate a laser spot on the surface that is visible to the audience. Their use has become commonplace at venues where presentation materials are shown on a display screen. Most common laser pointers emit red, green, or blue light of at most 1 or 5 mWatts to avoid damage to human eyes.

Laser pointers may also include command switches or buttons for enabling remote control of basic computer functions during the presentations. For example, U.S. Patent Publication Nos. 200710030460, 2006/0227107, and 2006/0197756 and U.S. Pat. No. 6,417,840 all describe laser pointers with command switches mounted thereon to enable remote initiation of various commands at the presentation computer. The commands may include, for example, page-up and page-down commands to indicate to the presentation computer that a new image or page of presentation material is to be displayed and projected onto the projection area. In some cases, the laser spot generated by the laser pointer may function as a control cursor. The presenter may direct the control cursor to a position in the screen and emulate position-dependent commands via the switches.

These position-dependent commands require that the laser spot be detected and its position determined on the projection surface. Various approaches have been used to locate laser spots on projection surfaces, including integrating image sensors with the projection surface or with the projection device. The position of the laser spot may be detected by the image sensors and determined by a controller or computer connected to the image sensors.

In United States Patent Publication Number 2004/0012565, for example, the projection surface is an interactive tiled Organic Light Emitting Diode ("OLED") display with an array of photosensors integrated into it for detecting the laser spot in a given tile of the display. A display controller is connected to the display screen to generate a signal representing the location of the laser spot. The location is transmitted from the controller to the presentation computer, which is programmed to respond to the signal to selectively change the image being displayed.

Image sensors integrated into projection devices are provided, for example, in U.S. Pat. No. 6,050,690 and U.S. Patent Publication Nos. 2007/0030460 and 2006/0170874. The image sensors may be used to detect a laser spot generated by a laser pointer on a projection surface. The position of the laser spot may be used together with pulsing signals generated at command switches on the laser pointers to emulate mouse click operations or other commands at the projection device or presentation computer. In one example, a user may press a button mounted on the laser pointer to cause it to pulse at a given frequency. The pulsation indicates to the projection device that the laser pointer position is to be monitored for a mouse "dragging" event until the user presses the button again to stop the pulsation. Different frequencies may be used to activate different mouse events.

These and other currently-available projection devices either require a custom-based projection surface (such as the tiled OLED display screen described above) or a laser pointer with command switches to provide position-dependent commands to a presentation device. Using command switches on laser pointers to emulate mouse commands may, at best, be cumbersome to the user operating the laser pointer. The user must change focus from giving the presentation to operating the switches. The switches may be prone to error or fail entirely during a presentation.

Furthermore, the projection devices and laser pointers available today may only be used to assist in the remote control of presentation computers. They are not able to assist in the remote control of other devices, such as video game players, DVD players, satellite receivers, and so on.

Accordingly, it would be desirable to provide a projection apparatus that is capable of emulating a remote control device such as a wireless mouse without the use of command switches. In particular, it would be desirable to provide a projection apparatus and method for locating the position of a laser spot generated by a laser pointer and using the position to control a remote device connected to the projection apparatus.

SUMMARY OF THE INVENTION

A dual-mode projection apparatus has a projection module for projecting an image onto a projection surface. An image sensor module captures images of the projection surface and determines spatial and temporal characteristics of a visible light spot superimposed on the projection surface. A communications module transmits the spatial and temporal characteristics of the visible light spot to a remote device for remote control of the device based on the spatial and temporal characteristics of the visible light spot.

An embodiment of the invention includes an optical apparatus having a light pointer with on/off power switch for turning the light pointer on/off. A projection apparatus projects an image onto the projection surface. The projection apparatus has an image sensor module for capturing images of the projection surface and determining spatial and temporal characteristics of a visible light spot superimposed on the projection surface and generated by the light pointer. The projection apparatus also has a communications module for transmitting the spatial and temporal characteristics of the visible light spot to a remote device for remote control of the device based on the spatial and temporal characteristics of the visible light spot.

Another embodiment of the invention includes a method for controlling a remote device with a dual-mode projection apparatus and a light pointer. A first image is projected onto a projection surface with a projection module in the dual-mode projection apparatus. A second image is captured from the projection surface with an image sensor module integrated into the dual-mode projection apparatus. A visible light spot is detected in the second image with the image sensor module, the visible light spot generated by the light pointer. Spatial and temporal characteristics of the visible light spot are determined with the image sensor module. The spatial and temporal characteristics of the visible light spot are transmitted to a remote device. The remote device is controlled based on the spatial and temporal characteristics of the visible light spot.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

A dual-mode projection apparatus is provided. As generally used herein, a projection device or projector may be a device for projecting digital images onto a projection surface for presentation to an audience. The projection surface area may be, for example, a display screen, wall, or any other surface in which projected images become visible to the audience. The digital images may be generated at a personal computer or any other image source device connected to the projection device, such as DVD players, DVRs, VCRs, satellite receivers, cable systems, and video game players, among others.

The dual-mode projection apparatus also includes an image sensor module having an image sensor and optionally a processor. The dual-mode projection apparatus is capable of both projecting images onto a projection surface and capturing images from the projection surface. An image sensor, as generally used herein, may be a device or circuitry having an array of pixels for capturing and processing an optical image into electronic signals. The electronic signals may be processed by the image sensor or the processor to determine a position corresponding to a visible light spot superimposed on top of the digital images at the projection surface. The visible light spot may be generated by a light pointer capable of emitting a light beam onto the projection surface to highlight particular locations or items of interest on the projection surface.

Figure 1:
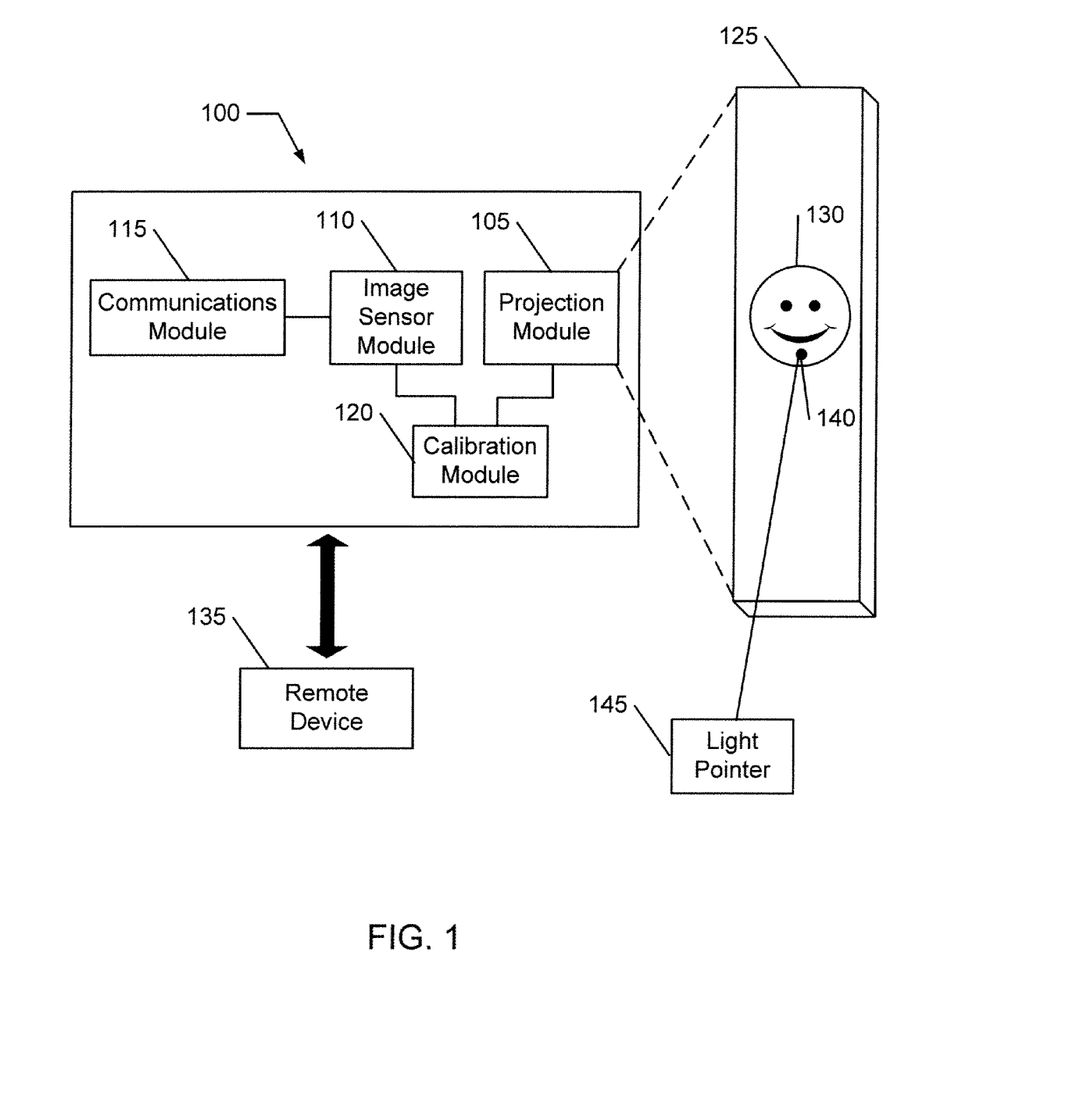
FIG. 1 illustrates a dual-mode projection apparatus constructed according to an embodiment of the invention.

A dual-mode projection apparatus constructed according to an embodiment of the invention is illustrated in FIG. 1. Projection device 100 has a projection module 105, an image sensor module 110, a communications module 115, and a calibration module 120. Projection module 105 includes hardware and/or software routines for projecting digital images onto projection surface 125, such as digital image 130. Projection surface 125 may be a display screen, wall, or any other surface in which projected images may become visible to an audience.

Digital image 130 may be generated at remote device 135, which may be a personal computer or any other image source device connected to projection device 100, such as DVD players, DVRs, VCRs, satellite receivers, cable systems, and video game players, among others. Digital image 130 is transmitted from remote device 135 to projection device 100 via a wireless link through a wireless module (not shown) on remote device 135 and communications module 115 on projection device 100.

Communications module 115 may be a wireless communications module including a wireless receiver for receiving digital images from remote device 135 and a wireless transmitter for transmitting information to remote device 135. Communications module 115 may be, for example, a WiFi or Bluetooth wireless module.

It is appreciated that communications between projection device 100 and remote device 135 may also be performed through wired connections without deviating from the scope and principles of the invention. For example, communications module 115 may be a communications module providing Ethernet communications between projection device 100 and remote device 135.

The information transmitted to remote device 135 may include, for example, spatial and temporal characteristics of a visible light spot on projection surface 125, such as light spot 140 generated by light pointer 145. Light pointer 145 may be any light pointer including a light source for emitting a light beam at a given wavelength, for example, wavelengths corresponding to red, green, or blue light, to produce visible light spot 140. The visible light spot 140 can appear on projection surface 125 in different patterns and shapes, such as a circular block, the shape of a butterfly, the shape of a cursor, and so on.

In one embodiment, light pointer 145 may be a laser pointer including a laser for emitting a coherent light beam. In another embodiment, light pointer 145 may be a light pointer including a Light Emitting Diode ("LED") for emitting an incoherent light beam. Other light sources for emitting light beams and producing a visible light spot on projection surface 125 are also within the scope and principles of the invention.

According to an embodiment of the invention, when light pointer 145, facing projection surface 125, projects a light beam onto it to produce visible light spot 140, light is reflected from projection surface 125 and sensed by image sensor module 110 in projection device 100. Image sensor module 110 sees the projection surface 125 and the visible light spot 140 thereon and captures an image of the projection surface 125 to determine spatial and temporal characteristics of light spot 140.

The spatial and temporal characteristics may include a position of light spot 140 on projection surface 125, a velocity and an acceleration of light spot 140 as it moves across projection surface 125, or a sequence of positions of light spot 140 over a sequence of images captured by image sensor module 110 over time, among other characteristics. These characteristics may be computed by processing and analyzing the captured images.

In one exemplary embodiment, the position of light spot 140 may be detected as a 2D (x,y) coordinate with a corner of projection surface 125 serving as the reference (0,0) point. Alternatively, the position of light spot 140 may be a displacement between the current position and a previous position, with the initial position determined when light pointer 145 is first powered up.

It is appreciated that image sensor module 110 may be adapted to sense light only at the wavelength of light pointer 145. For example, image sensor module 110 may include an optical filter to capture only the wavelength of visible light spot 140 and reject all other optical information at other wavelengths, including digital image 130, the projection surface 125, the ambient light around projection surface 125, and so on. It is also appreciated that image sensor module 110 may be able to sense light at all wavelengths. In this case, image sensor module 110 captures both the visible light spot 140 and the digital image 130 displayed on projection surface 125.

Further, it is appreciated that projection device 100 is a dual-mode projection device as it is capable of both projecting images onto projection surface 125 (with projection module 105) and capturing images from projection surface 125 (with image sensor module 110).

Projection device 100 also includes calibration module 120 to align image sensor module 110 with projection module 105 and projection surface 125 so that image sensor module 110 may accurately capture the position of light spot 140 on projection surface 125. Calibration module 120 may include hardware and/or software routines for performing the alignment of image sensor module 110. The alignment may be performed automatically without any user input upon powering up projection device 100 to project images on projection surface 125.

Calibration module 120 may also include hardware and/or software routines for automatically calibrating projection module 105 to accurately orient the images to be displayed onto projection surface 125, such as by performing keystone correction and aligning the images to fit properly within the horizontal and vertical boundaries of projection surface 125.

In one embodiment, the automatic calibration of projection module 105 may be performed in conjunction with the automatic calibration of image sensor module 110. This may be achieved by having image sensor module 110 capture the image displayed by projection module 105 onto projection surface 125 and use the captured image to align both image sensor module 110 and projection module 105 to accurately display the image onto projection surface 125. In doing so, calibration module 120 determines the geometric correspondence between projection module 105, image sensor module 110 and projection surface 125 for accurately locating the positional coordinates of visible light spot 140 on projection surface 125.

The spatial and temporal characteristics of light spot 140 are transmitted to remote device 135 by wireless communications module 115. Remote device 135 receives the spatial and temporal characteristics of light spot 140 and uses them to control one or more of its functions. According to an embodiment of the invention, remote device 135 is controlled solely based on the position of light spot 140. In this case, unlike currently-available light pointers used in conjunction with projection devices to control a presentation computer, light pointer 145 does not have any switches mounted thereon to emulate mouse-click commands or to send different pulsing signals to the remote device to emulate the mouse-click commands.

It is appreciated that remote device 135 may have a wireless module (not shown) capable of transmitting digital images to and receiving information from projection device 100 via communications module 115. It is also appreciated that remote device 135 may include control routines for controlling the one or more of its functions based on the position of light spot 140.

In one exemplary embodiment, remote device 135 may be a computer generating images for display by projection device 100 at projection surface 125, which may be a display screen for displaying images to an audience, e.g., during a presentation. A user may shine light spot 140 in the display screen to indicate to remote computer 135 that a given command is to be performed, such as a command modifying the presentation of the digital images on projection surface 125. The position of light spot 140 is detected by image sensor module 110 in projection device 100 and transmitted to remote computer 135 via communications module 115.

The command may be, for example, a command to go to the next image of the presentation if the position of light spot 140 is in a given location of projection surface 125, such as a region corresponding to an icon indicating an image or page number of the presentation. Alternatively, light pointer 145 may also be moved continuously across projection surface 125 to indicate to remote computer 135 that a new image of the presentation is to be displayed.

In this exemplary embodiment, remote computer 135 may have a scaling routine to scale the position on projection surface 125 to a position on the image displayed on surface 125. The position of light spot 140 on projection surface 125 is determined with 2D coordinates at the scale of projection surface 125. Upon receiving the position of light spot 140, remote computer 135 maps the received position into 2D coordinates at the scale of the image displayed on surface 125 with the use of the scaling routine.

It is appreciated that remote computer 135 may have a pre-determined mapping from projection surfaces into presentation images. It is also appreciated that remote computer 135 may determine the mapping upon connection with projection device 100 to project the images onto the display screen.

Further, it is appreciated that positioning the light spot 140 on the icon or moving the light pointer 145 continuously has the same effect as clicking a button on a mouse associated with remote computer 135 to go to the next image of the presentation. In this exemplary embodiment, light pointer 145 together with projection device 100 effectively operate as a wireless mouse associated with remote computer 135.

In another exemplary embodiment, remote device 135 may be a video game player. Light pointer 145 may be used as a remote control for the video game player by positioning the light spot 140 according to a desired command. For example, the video game player 135 may be an interactive action game and the light pointer 145 may be used to position a target on projection surface 125. When the position of the light spot 140 is detected by image sensor module 110 in projection device 100 and transmitted to video game player 135 by communications module 115, video game player 135 is directed to perform an action on the target corresponding to that position, such as, for example, shooting at or driving to the target.

In yet another exemplary embodiment, remote device 135 may be a television appliance, for example, remote device 135 may be a satellite receiver, cable receiver, or set-top box. Light pointer 145 may be used as a remote control for the television by positioning the light spot 140 on a region of the projection surface 125 indicating a channel of the television, such as, for example, an icon on projection surface 125 corresponding to the channel being displayed by projection device 100. When the position of light spot 140 is detected by image sensor module 110 in projection device 100 and transmitted to the television appliance 135 by communications module 115, television appliance 135 is directed to change the television channel.

In a further exemplary embodiment, remote device 135 may be a controller connected to a network of appliances. For example, controller 135 may be a presentation computer displaying images for presentation at projection screen 125 to an audience in a presentation room. Controller 135 may be connected to a network of computers outside the presentation room. Light pointer 145 may be used as a remote control for the computers in the network, such as to direct the remote computers to perform actions connected to the presentation in the presentation room, e.g., by positioning the light spot 140 on a given image shown during the presentation to run animations on the computers. When the image sensor module 110 in projection device 100 detects that the light spot 140 is on the image and its position is transmitted to controller 135, controller 135 may send commands to the computers in the network to run the animations.

It is appreciated that these exemplary embodiments are given for purposes of illustration only and additional exemplary embodiments are within the scope of the invention. It is also appreciated that remote device 135 may include control routines to control one or more of its functions based on the position of light spot 140 according to each exemplary embodiment. It is also appreciated that remote device 135 may use the position of light spot 140 to control another device connected to remote device 135, such as, for example, in the exemplary embodiment of the controller described above.

It is further appreciated that remote device 135 may include training and adaptation routines to interpret different positions of light spots generated by light pointer 145 as different commands. For example, remote device 135 may interpret a position on the upper left corner of projection surface 125 to correspond to a page down command, a position on the lower left corner of projection surface 125 to correspond to a page up command, a position on the upper right corner of projection surface 125 to correspond to an animation command, and so on.

Figure 2:
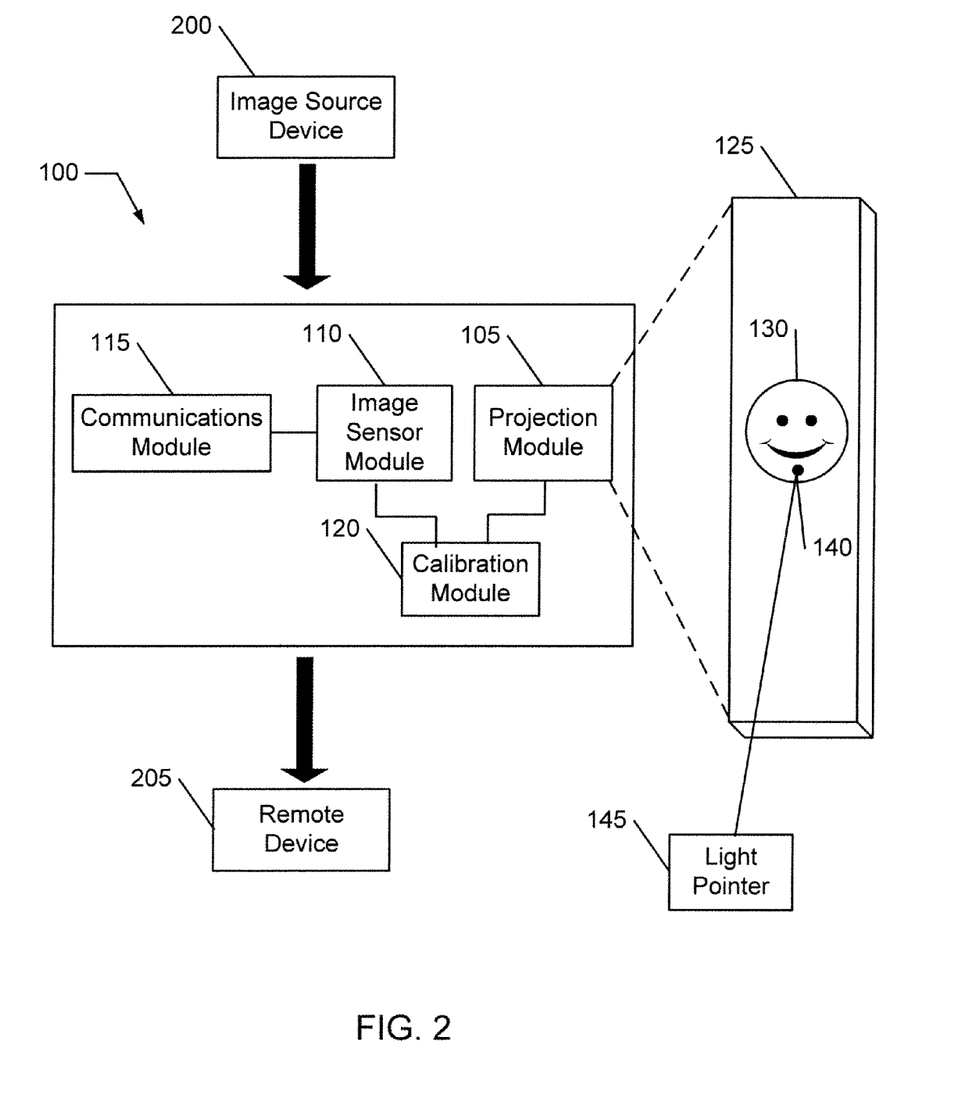
FIG. 2 illustrates an exemplary environment in which the dual-mode projection apparatus may be used according to an embodiment of the invention.

Another exemplary embodiment for using the dual-mode projection apparatus is illustrated in FIG. 2. In this embodiment, projection device 100 may be used to display images generated at image source device 200 connected to projection device 100 via communications module 115. The position of visible light spot 140 may be used to control remote device 205 also connected to projection device 100 via communications module 115, as described above with reference to remote device 135 shown in FIG. 1.

This embodiment may be used in the case where the device to be controlled is not the device generating images for display by projection module 105. For example, remote device 205 may be a toy, game, or other appliance that may be directed to perform commands according to the position of the visible light spot 140 on projection surface 125, such as a flight simulator or other interactive game that can perform position-dependent actions based on the position of visible light spot 140 on projection surface 125.

It is appreciated that remote device 135 and remote device 205 are remote in the sense that they are located away from projection surface 125 and light pointer 145. Remote devices 135 and 205 may be integrated with projection device 100 in a single device, such as, for example, a video game player with an integrated projection module, without deviating from the scope and principles of the invention.

Figure 3:
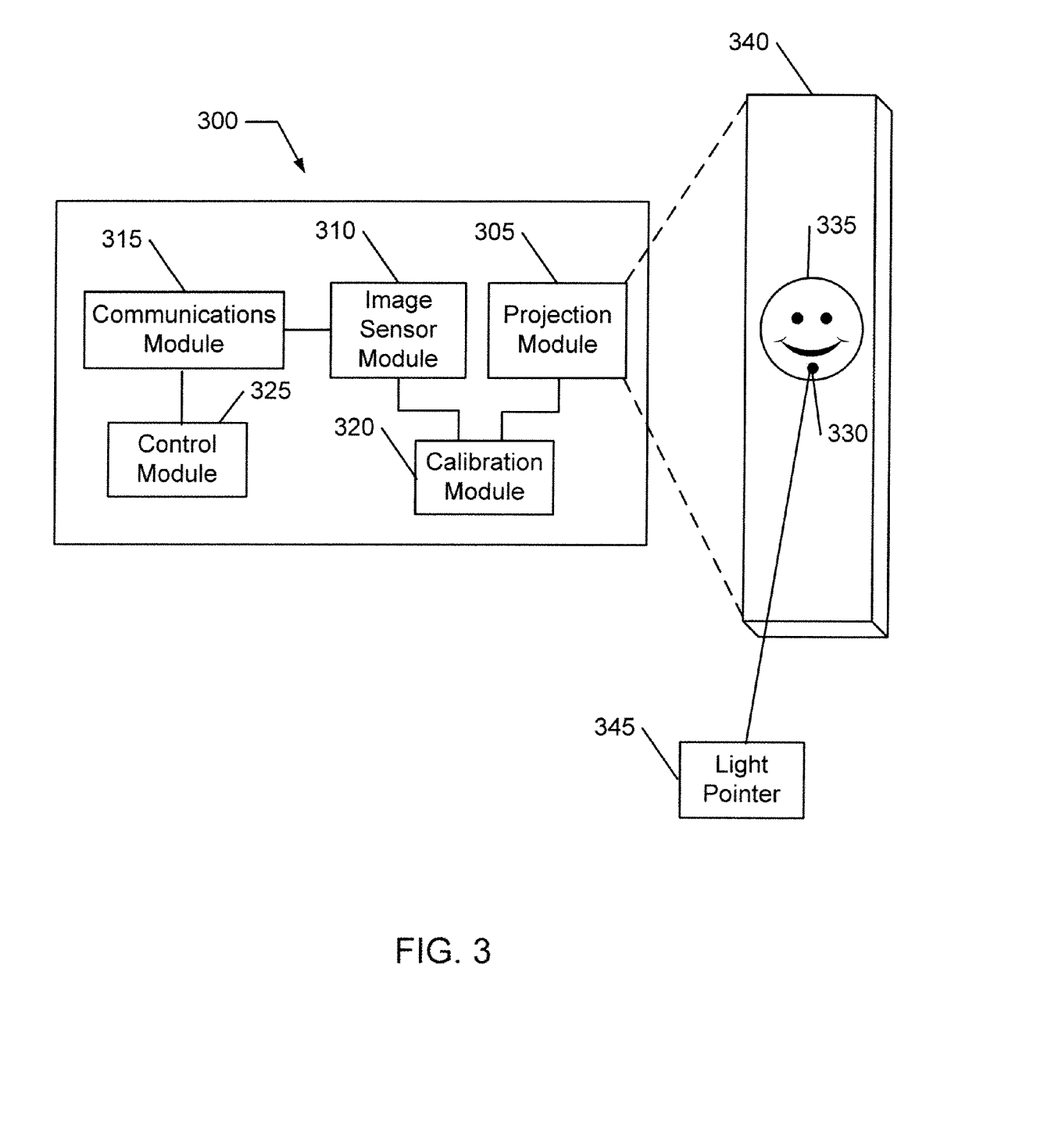
FIG. 3 illustrates a dual-mode projection apparatus constructed according to another embodiment of the invention.

FIG. 3 illustrates such a dual-mode projection apparatus. Dual-mode projection device 300 includes projection module 305, image sensor module 310, communications module 315, and calibration module 320, similar to dual-mode projection apparatus 100 of FIGS. 1-2. Dual-mode projection device 300 also includes control module 325 for controlling the functions and operation of device 300 in response to the spatial and temporal characteristics of visible light spot 330 on digital image 335 shown on projection surface 340. Visible light spot 330 is generated by light pointer 345, which serves as a remote control for device 300.

In one exemplary embodiment, device 300 may be an integrated computer/projector device. Light pointer 345 may be used as a wireless mouse to control device 300, such as, for example, to control device 300 during presentations of digital images onto projection surface 340. In another exemplary embodiment, device 300 may be an integrated video player/projector device. Light pointer 345 may be used as a video game console to control video games played at device 300. For example, light pointer 345 may be used to project visible light spot 330 onto projection surface 340 for the purposes of tracking or shooting at an object of a video game played at device 300.

It is appreciated that these exemplary uses of device 300 are provided for illustration purposes only. Device 300 may be used in other contexts to provide control for its functions based on the spatial and temporal characteristics of a visible light spot in a projection surface onto which images from device 300 are projected.

Figure 4:
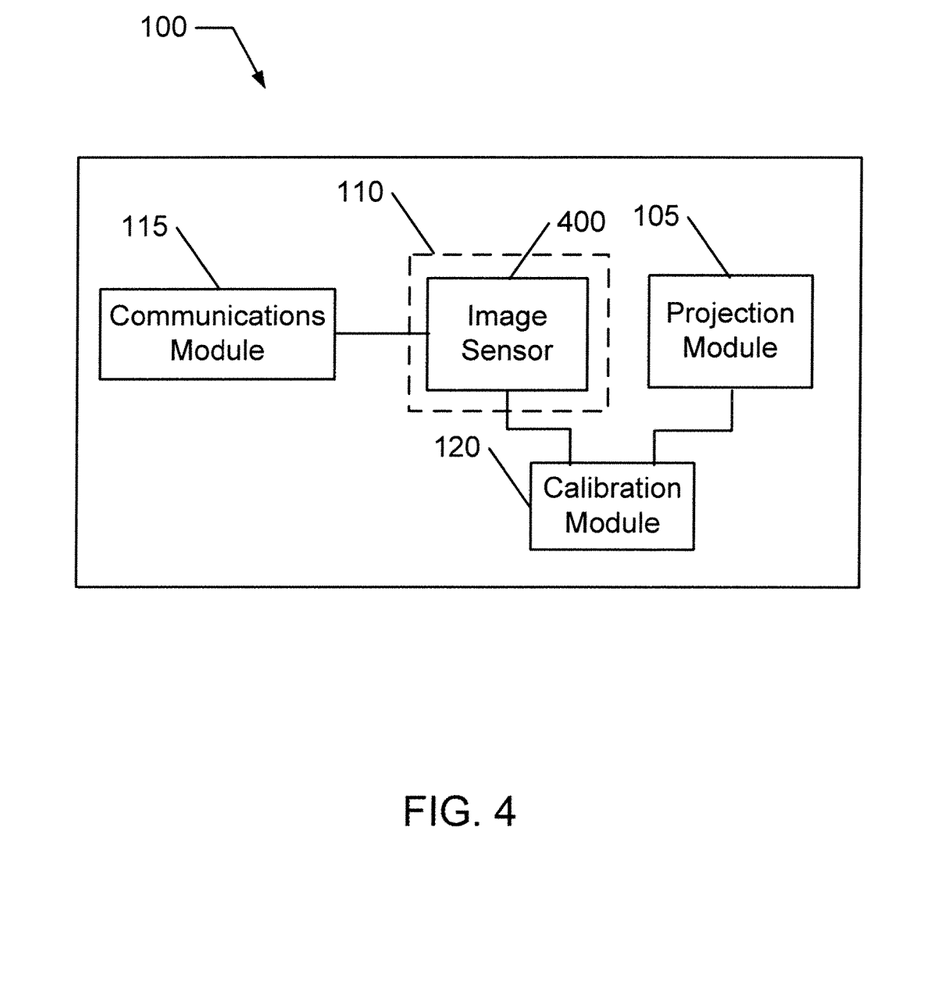
FIG. 4 illustrates a detailed view of the dual-mode projection apparatus of FIG. 1.

A more detailed view of a dual-mode projection apparatus constructed according to an embodiment of the invention is shown in FIG. 4. Image sensor module 110 in dual-mode projection device 100 includes image sensor 400. Image sensor 400 may be a CMOS or CCD image sensor, or any other type of image sensor capable of capturing optical images.

In one exemplary embodiment, image sensor 400 may include an optical filter for capturing only visible light spots, e.g., visible light spot 140 on projection surface 125 of FIG. 1.

In another exemplary embodiment, image sensor 400 may capture light at all wavelengths.

Image sensor 400 may have processing capabilities embedded into it for determining the position of visible light spot 140 on projection surface 125 upon sensing the visible light spot 140 on projection surface 125. In this case, no additional processor is required to determine the position of visible light spot 140. All processing is performed directly by image sensor 400.

Figure 5:
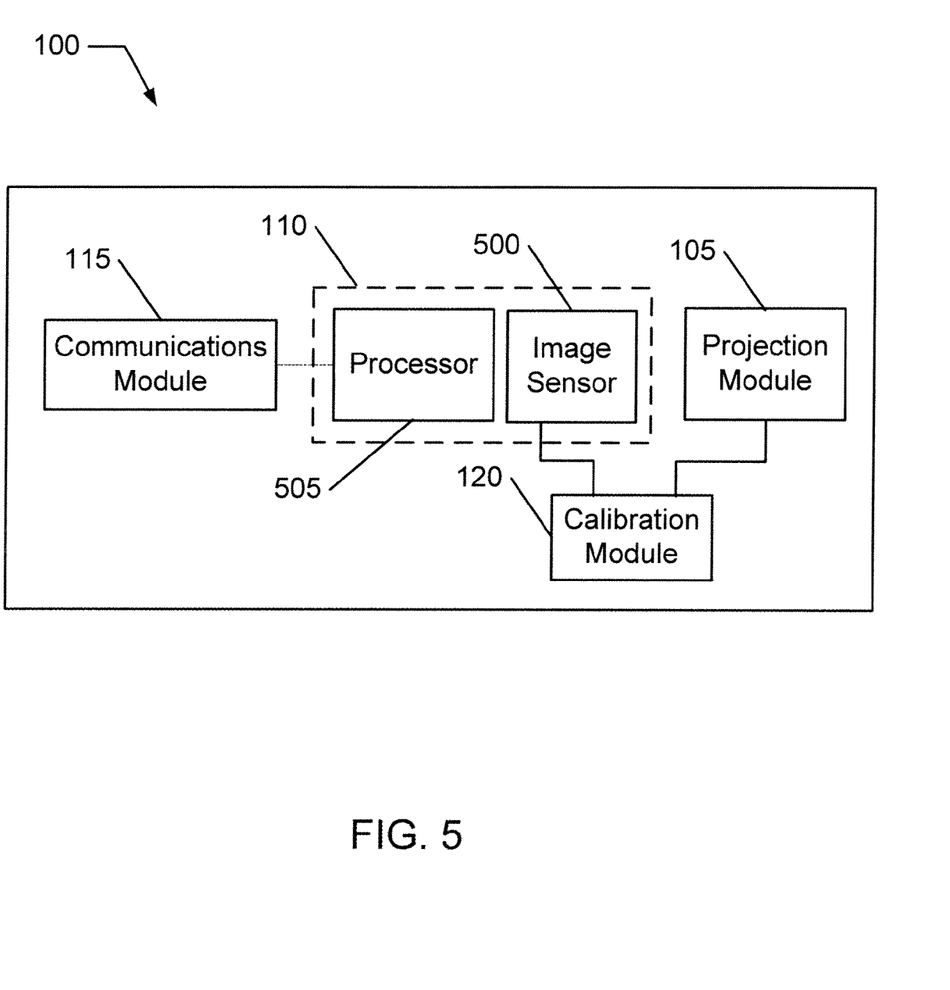
FIG. 5 illustrates a more detailed view of the dual-mode projection apparatus of FIG. 1.

Another detailed view of the dual-mode projection apparatus constructed according to an embodiment of the invention is shown in FIG. 5. In this case, image sensor module 110 includes both image sensor 500 and processor 505. Image sensor 500 and processor 505 as shown may be mounted on separate chips. Image sensor 500 may be a CMOS or CCD image sensor, or any other type of image sensor capable of capturing optical images. Processor 505 may be a Digital Signal Processor ("DSP"), an Image Signal Processor ("ISP"), or any other kind of processor capable of interfacing with image sensor 500.

In one exemplary embodiment, image sensor 500 captures an image of visible light spot 140 on projection surface 125 and transmits the image to processor 505 for analysis and processing. Processor 505 may then execute image processing routines to detect and locate the light spot 140 on the captured image. As described above, the 2D coordinates or displacement of the light spot 140 on projection surface 125 can be computed by processor 505 for remote control of a remote device, such as remote device 135 in FIG. 1 and remote device 205 in FIG. 2.

Figure 6:
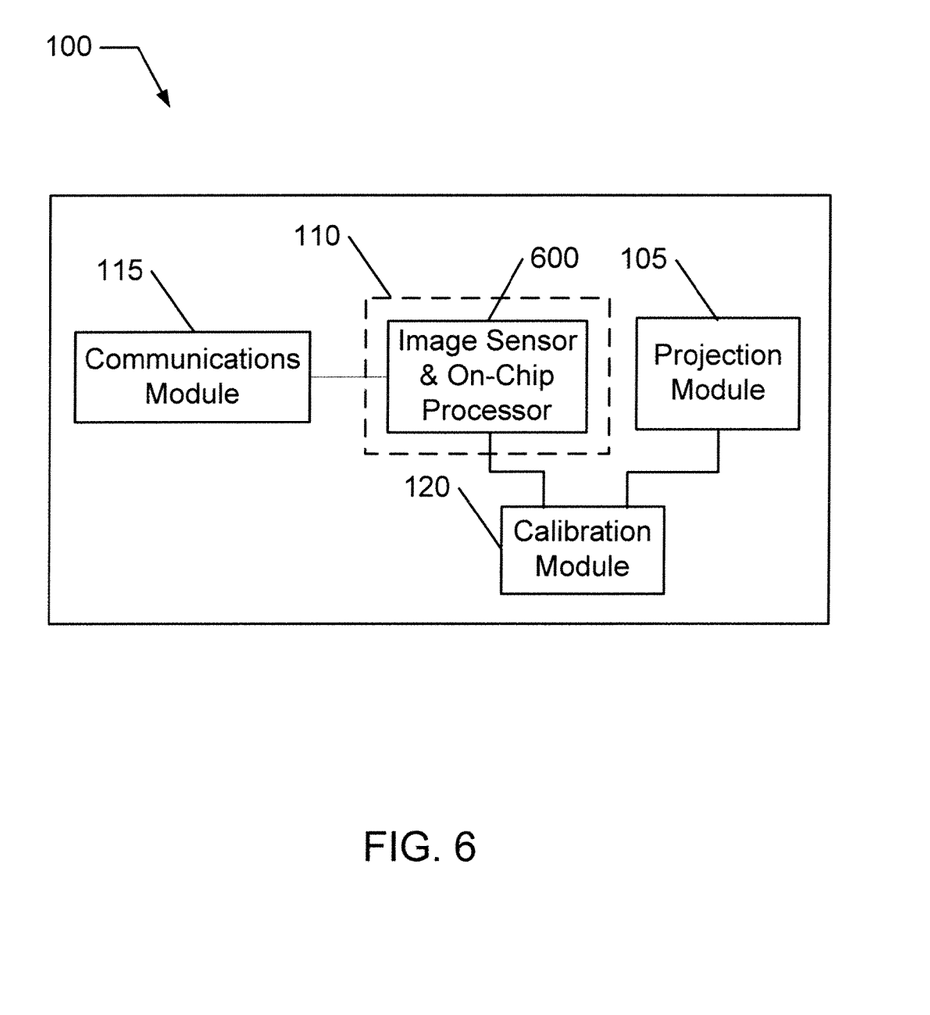
FIG. 6 illustrates a further detailed view of the dual-mode projection apparatus of FIG. 1

A further detailed view of a dual-mode projection apparatus constructed according to an embodiment of the invention is illustrated in FIG. 6. Image sensor module 110 in dual-mode projection apparatus 100 includes integrated image sensor/processor chip 600. Integrated chip 600 has both an image sensor and a processor on the same chip. The image sensor may be similar to image sensor 500 and the processor may be similar to processor 505, both shown in FIG. 5. In this exemplary embodiment, a single integrated chip 600 is used to both capture an image showing the light spot 140 and to detect the position of light spot 140 in the captured image.

Figure 7:
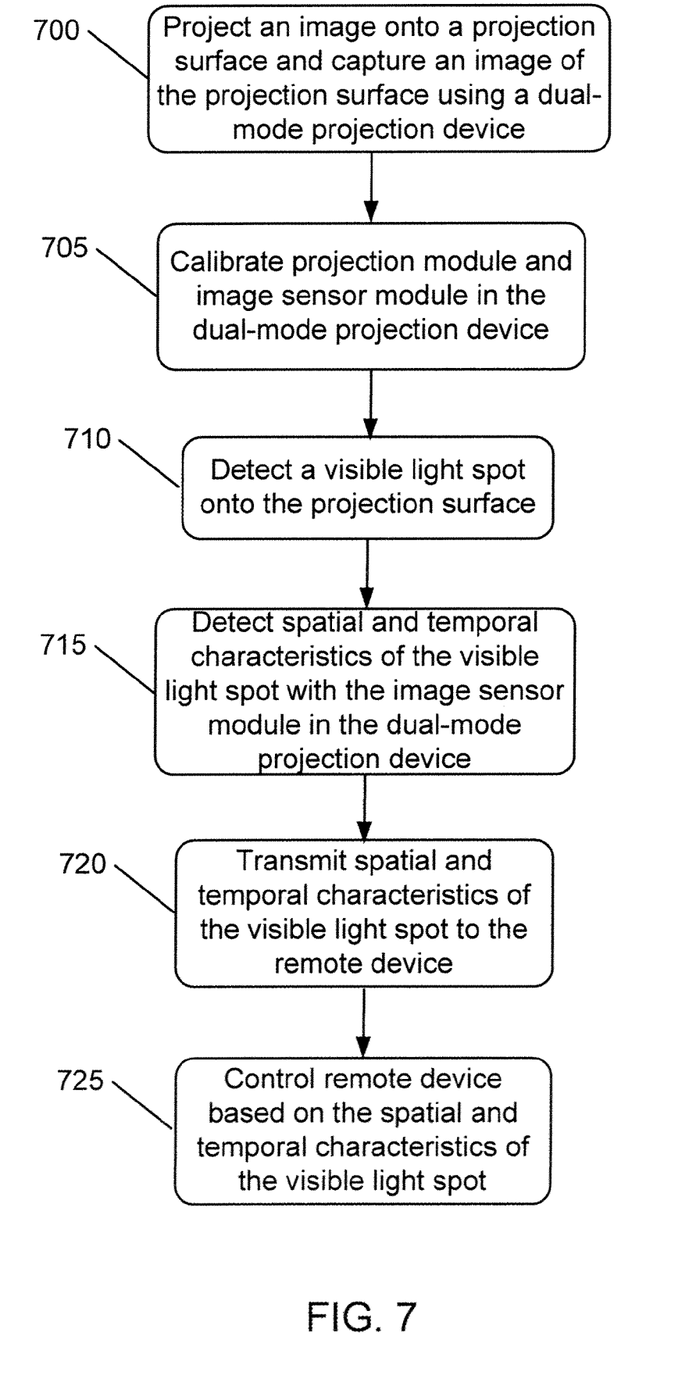
FIG. 7 illustrates a flow chart for controlling a remote device with a dual-mode projection apparatus and a light pointer in accordance with an embodiment of the invention.

Referring now to FIG. 7, a flow chart for controlling a remote device with a dual-mode projection apparatus and a light pointer in accordance with an embodiment of the invention is described. An image is projected onto a projection surface with a projection module in a dual-mode projection device, such as projection module 105 in dual-mode projection device 100. An image is also captured from the projection surface with an image sensor module integrated into the dual-mode projection device, such as image sensor module 110 in dual-mode projection device 100 in step 700. The projection module and the image sensor module in the dual-mode projection device are then calibrated to accurately align the image with the projection surface in step 705. A light spot is then detected on the captured image in step 710. The light spot is generated by a light pointer facing the projection surface.

Remote control of the remote device is achieved by first determining spatial and temporal characteristics of the visible light spot on the projection surface with the image sensor module in step 715. The spatial and temporal characteristics are transmitted to the remote device by a communications module in step 720, e.g., communications module 115 in dual-mode projection device 100. The remote device is then controlled based on the spatial and temporal characteristics, e.g., position, velocity, acceleration, of the visible light spot on the projection surface in step 725.

It is appreciated that in case the projector apparatus is integrated into the remote device, such as in case of device 300 of FIG. 3, the spatial and temporal characteristics are sent to a control module in the integrated device to control its functions.

Figure 8:
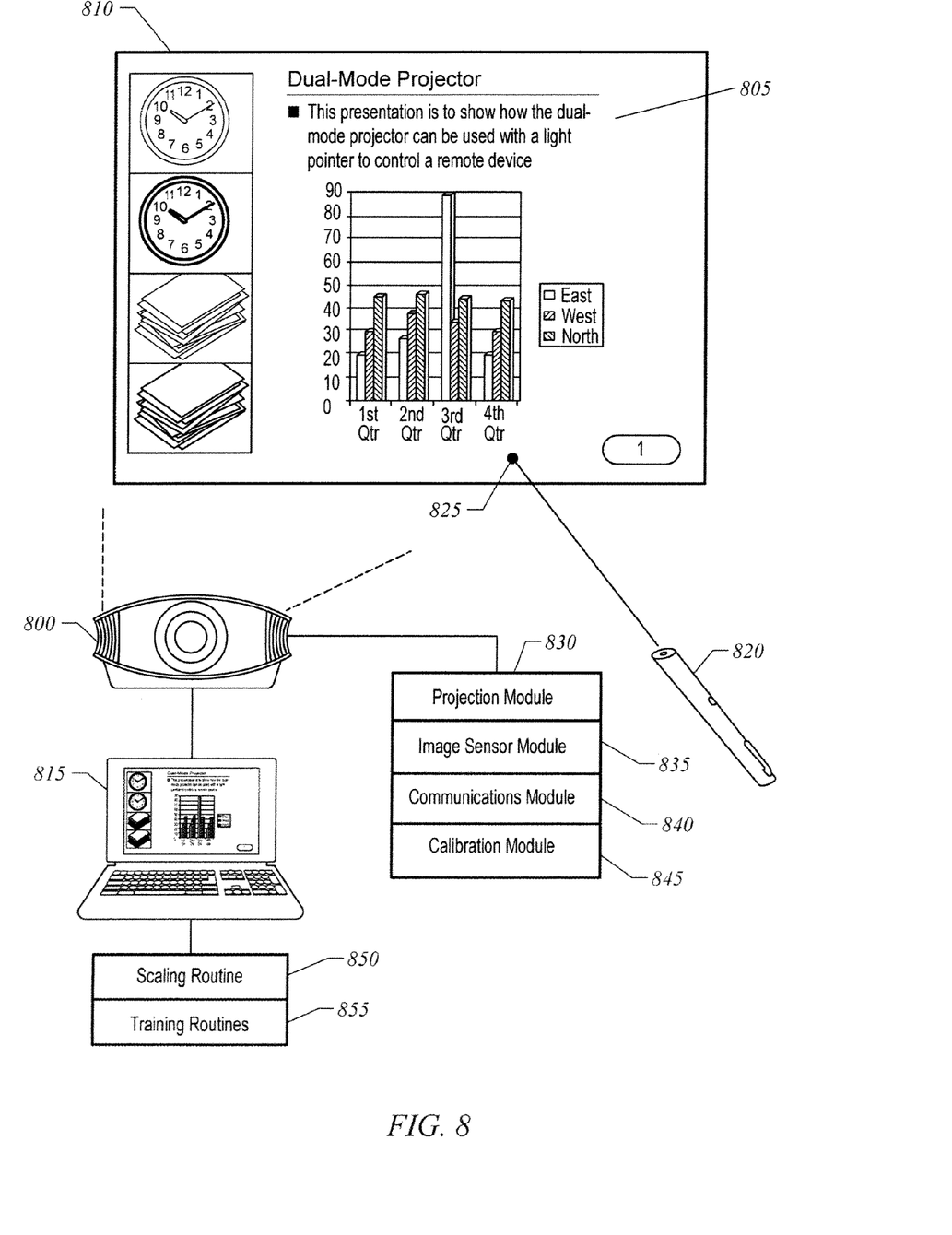
FIG. 8 illustrates an exemplary environment in which the dual-mode projection apparatus operates in accordance with an embodiment of the invention.

An exemplary environment in which the dual-mode projection apparatus operates in accordance with an embodiment of the invention is illustrated in FIG. 8. Dual-mode projection device 800 may be used to project a digital image, e.g., digital image 805, onto projection surface 810. Projection surface 810 may be a display screen to display images generated by remote computer 815.

Light pointer 820 may be used during the presentation to highlight locations or items of interest in digital image 805 with a visible light spot, e.g., visible light spot 825, generated by a light beam emitted by light pointer 820. Light pointer 820 may be any light pointer for generating a visible light spot on a projection surface.

According to an embodiment of the invention, dual-mode projection apparatus 800 has a projection module 830, an image sensor module 835, a communications module 840, and a calibration module 845. Projection module 830 projects digital image 805 onto projection surface 810, similar to projection module 105 in projection device 100 shown in FIG. 1.

Image sensor module 835 detects visible light spot 825 on projection surface 810 and determines its position. As described above, image sensor module 835 may include an image sensor and optionally a processor, such as image sensor module 110 shown in FIGS. 4-5.

The position of light spot 825 may be transmitted to remote computer 815 by communications module 840, which may be a wired or wireless communications module similar to communications module 115 in projection device 100. Calibration module 845 aligns the projection module 830 with the image sensor module 835 to accurately position and sense digital image 805.

Remote computer 815 may use the position of light spot 825 to control one or more of its functions. For example, the remote computer 815 may use the position of light spot 825 to direct an operation to be performed on the presentation. e.g., to go to a previous or next image of the presentation, to start an animation, to superimpose another image on top of the current image 805, and so on.

It is appreciated that remote computer 815 may have scaling routine 850 to map the position of light spot 825 on display screen 810 into a position at the scale of the image displayed on display screen 810. For example, a 2D coordinate $(x_1, y_1)$ in the display screen 810 may correspond to a 2D coordinate $(x_2, y_2)$ in the image being displayed. It is also appreciated that remote computer 815 may have training and adaptation routine 855 to interpret different positions of light spots generated by light pointer 820 as different commands as described above.

Figure 9:
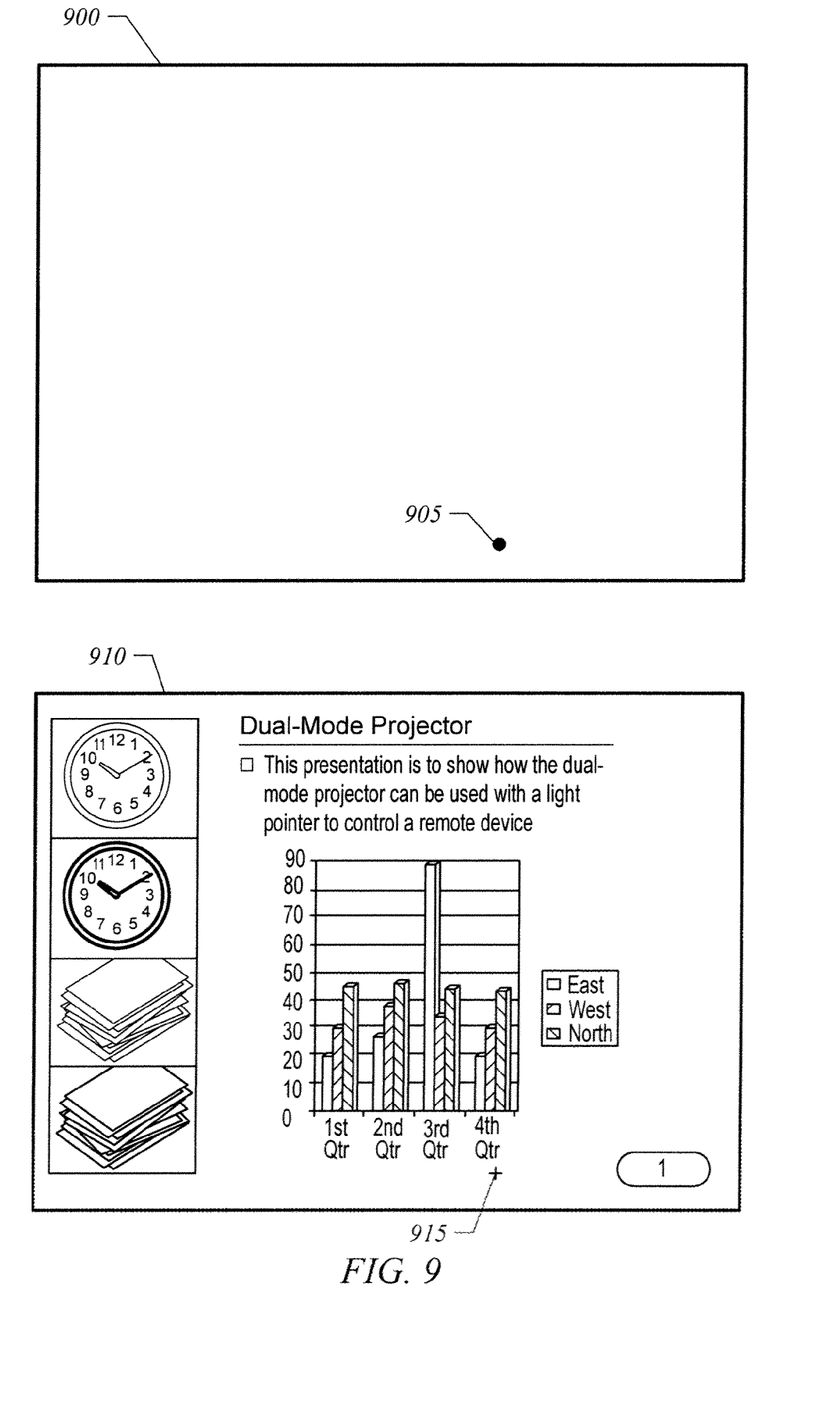
FIG. 9 illustrates exemplary images detected by the dual-mode projection apparatus in the exemplary environment of FIG. 8 in accordance with an embodiment of the invention.

FIG. 9 shows exemplary images captured and processed by dual-mode projection apparatus 800 shown in FIG. 8. Image 900 shows the optical image that the image sensor in the image sensor module 835 of projection device 800 sees when light pointer 820 projects light spot 825 onto display screen 810.

In one embodiment, the image sensor in image sensor module 835 may have an optical filter to capture only the wavelength of light spot 825 resulting in the image 900 as shown. In another embodiment, the image sensor in image sensor module 835 may also be able to capture image 805 in addition to visible light spot 825. The light spot 825 may be seen by the image sensor as a region 905, which may be a colorful region in the screen that appears different from the background.

For example, light spot 825 may appear as a monochromatic (e.g., red, green, or blue), typically nearly round region 905 at a given diameter and luminance. Image sensor module 835 processes the image 900 to detect and locate a 2D coordinate or displacement for the light spot 825. The processed image 910 may include a marking such as cross 915 to indicate the position of light spot 825.

It is appreciated that image sensor module 835 may include image processing routines for identifying region 905 as light spot 825 and for computing the 2D coordinate or displacement of light spot 825. These routines may include, for example, object and pattern recognition routines, edge detection routines, and other computer vision and image processing routines for differentiating the region 905 as light spot 825 from the rest of the captured image and locating its position.

Figure 10:
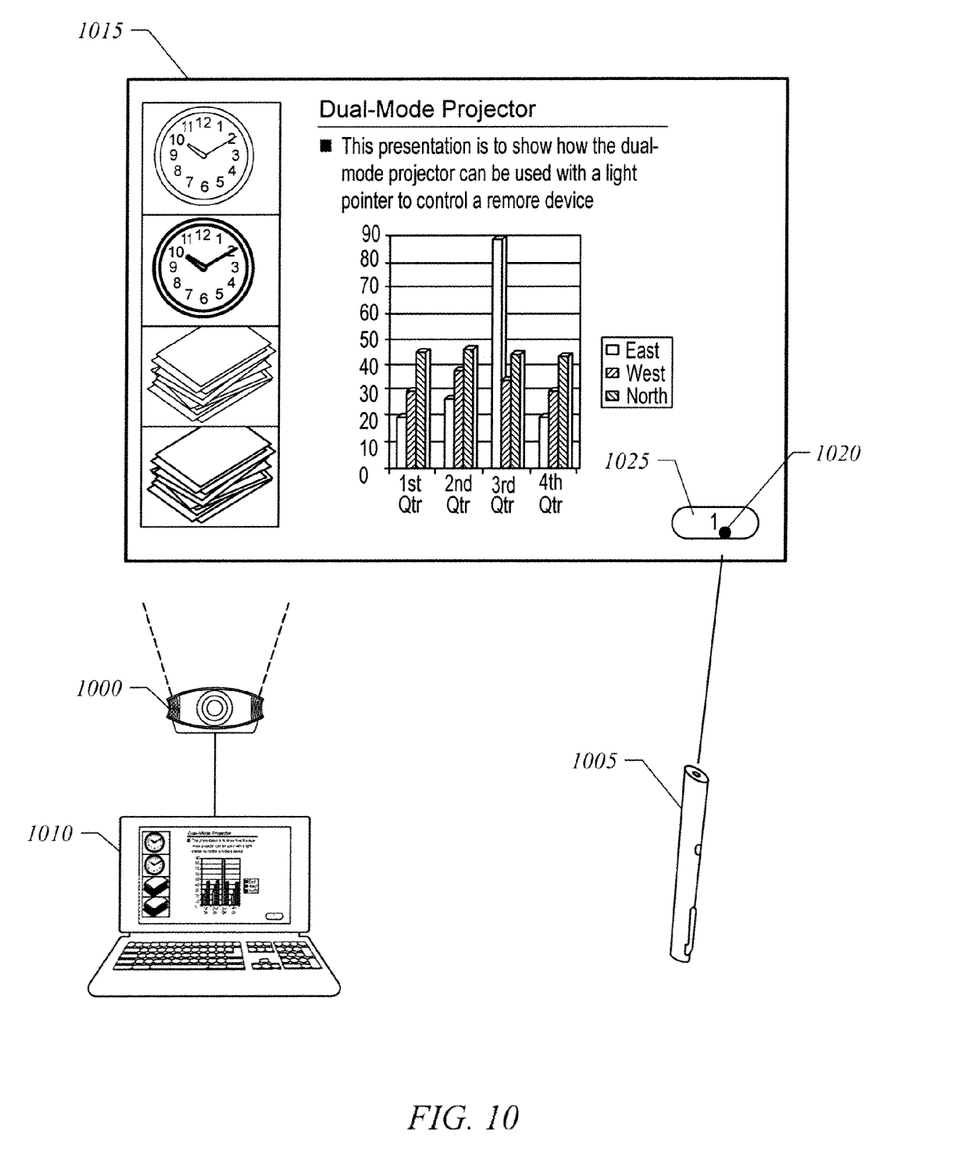
FIG. 10 illustrates another exemplary environment in which the dual-mode projection apparatus operates in accordance with an embodiment of the invention.

Another exemplary embodiment in which the dual-mode projection apparatus operates in accordance with an embodiment of the invention is shown in FIG. 10. Dual-mode projection device 1000 may be used together with light pointer 1005 as a remote control for remote computer 1010. Dual-mode projection device 1000 connected to remote computer 1010 may be used to project images onto display screen 1015 during a presentation. Light pointer 1005 may be used to project a light beam into light spot 1020 that, for example, superimposes icon 1025 on the image displayed on display screen 1015.

The image sensor module in dual-mode projection device 1000 sees the image displayed on display screen 1015 with the light spot 1020 superimposed onto icon 1025 and detects the position of light spot 1020. A transmitter module in projection device 1000 transmits the position to remote computer 1010. When remote computer 1010 receives the position of light spot 1020 and determines that light spot 1020 is within icon 1025, remote computer 1010 automatically displays the next image of the presentation for projection onto display screen 1015 by dual-mode projection device 1000.

Figure 11:
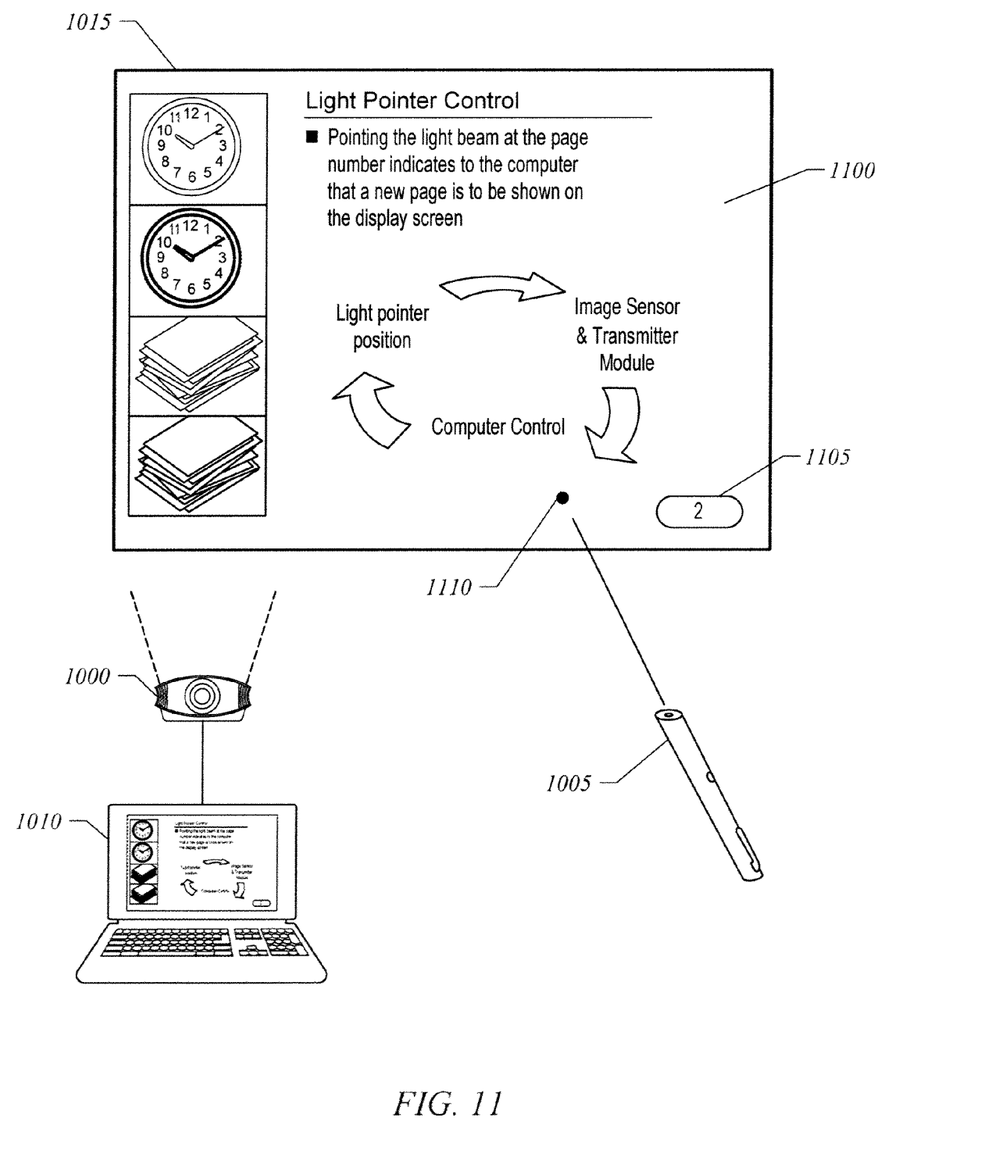
FIG. 11 illustrates a remote device being controlled by the dual-mode projection apparatus in the exemplary environment of FIG. 10 in accordance with an embodiment of the invention.

FIG. 11 illustrates the response of remote computer 1010 when controlled by projection device 1000 and light pointer 1005 shown in FIG. 10. Upon receiving the position of light spot 1020 on icon 1025 indicating that a new image is to be displayed for presentation onto display screen 1015, remote computer 1010 advances to the next image of the presentation. The next image is then projected onto display screen 1015 by projector 1000 as image 1100.

Image 1100 includes page icon 1105 indicating the new page number 2 of the presentation displayed onto display screen 1015. A presenter may then use light pointer 1005 to highlight items of interest on image 1100, such as by pointing light pointer 1005 to display screen 1015 to generate light spot 1110.

It is appreciated that light pointer 1005 together with projection device 1000 operate as a wireless mouse for remote computer 1010. It is also appreciated that remote computer 1010 may include routines for interpreting the position of light spots generated by light pointer 1005 to correspond to different mouse operations, such as select, right click, left click, drag, and so on.

Figure 12:
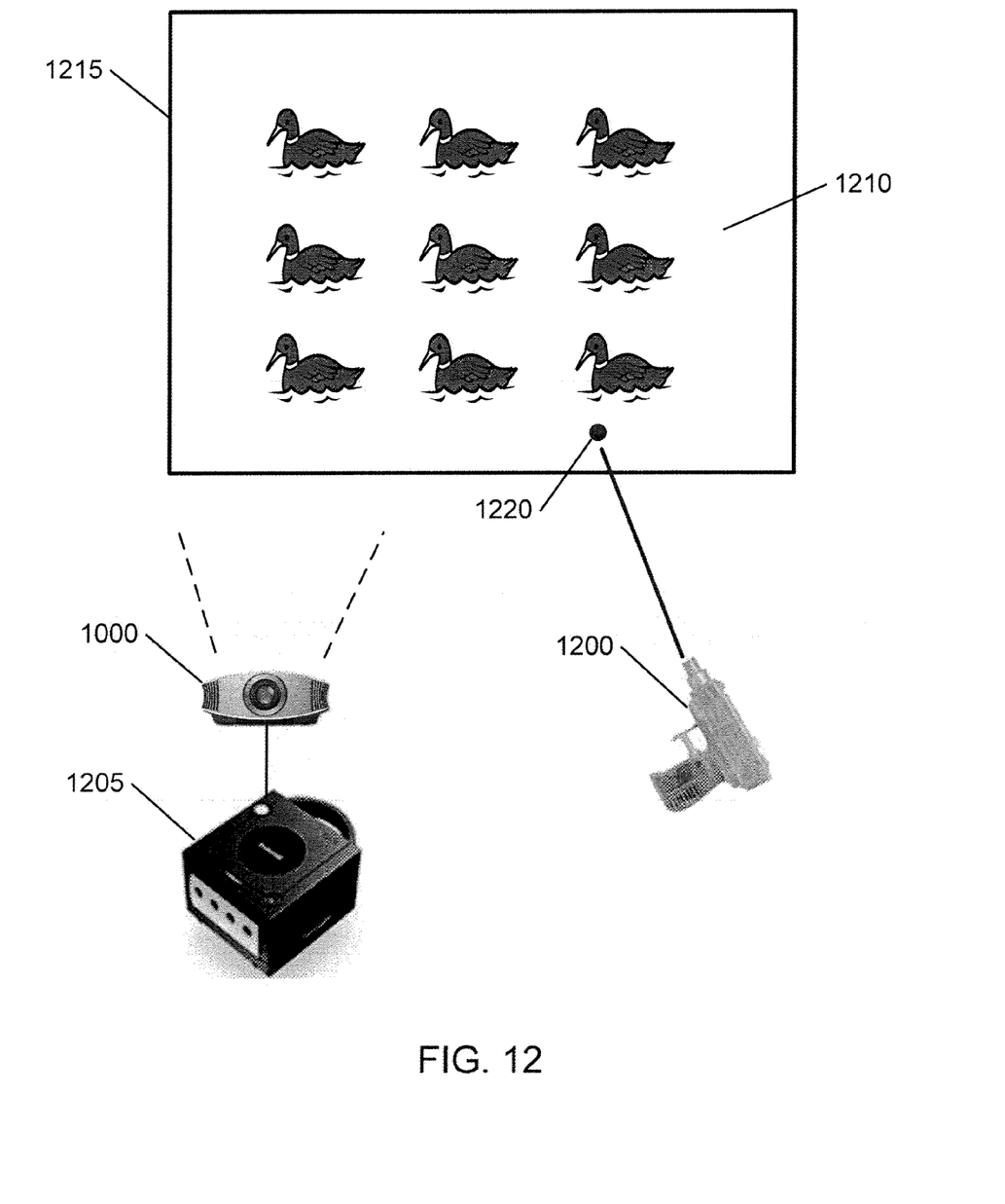
FIG. 12 illustrates a further exemplary embodiment in which the dual-mode projection apparatus operates in accordance with an embodiment of the invention.

Another exemplary embodiment in which the light pointer apparatus operates in accordance with an embodiment of the invention is shown in FIG. 12. In this exemplary embodiment, projection device 1000 is used with a light pointer 1200 that doubles as a video game console for video game player 1205 connected to projection device 1000. Light pointer 1200 together with projection device 1000 are used as a remote control for video game player 1105.

In the example shown, video game player 1205 is connected to projection device 1000 to project image 1210 of a "shooting ducks" video game being played on video game player 1205 onto display screen 1215. A user playing the video game may use light pointer 1200 to interact with the game, such as by projecting a light beam into light spot 1220 to target a duck shown on image 121 0.

The position of light spot 1220 is detected by the image sensor module in projection device 1000 and transmitted to video game player 1205 by the communications module in projection device 1000. Upon receiving the position, video game player 1205 directs the video game to record light spot 1220 as a failed attempt by the user to hit a duck target.

It is appreciated that light pointer 1200, video game player 1205, and video game image 1210 are shown for illustration purposes only. Other remote devices may be controlled with the use of the projection device of the invention without deviating from the scope and principles of the invention.

Advantageously, the dual-mode projection device of the invention enables a user to control a device remotely by simply pointing a light pointer to a desired position and detecting the position with the projection device. The light pointer may be any light pointer, including those without command switches. The remote device may be controlled based solely on the position of visible light spots generated by the light pointer and detected by the dual-mode projection device.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A dual-mode projection apparatus, comprising:
   a projection module for projecting an image onto a projection surface;
   an image sensor module for capturing images of the projection surface and determining spatial and temporal characteristics of a visible light spot of constant intensity superimposed on the projection surface; and
   a communications module for transmitting the spatial and temporal characteristics of the visible light spot to a remote device for remote control of the device based on the spatial and temporal characteristics of the visible light spot; wherein the spatial and temporal characteristics of the constant intensity light spot are interpreted as a plurality of commands.

2. The dual-mode projection apparatus of claim 1, wherein the spatial and temporal characteristics are selected from the list comprising: a position of the visible light spot on the projection surface; a velocity of the visible light spot on the projection surface; an acceleration of the visible light spot on the projection surface; and a sequence of positions of the visible light spot on the projection surface over a sequence of images projected onto the projection surface.

3. The dual-mode projection apparatus of claim 2, wherein the remote device is controlled based solely on the position of the visible light spot.

4. The dual-mode projection apparatus of claim 1, further comprising a calibration module for aligning the image sensor module with the projection module.

5. The dual-mode projection apparatus of claim 1, wherein the image sensor module comprises an image sensor.

6. The dual-mode projection apparatus of claim 5, wherein the image sensor is adapted to sense light only at a given wavelength.

7. The dual-mode projection apparatus of claim 5, wherein the image sensor module further comprises a processor.

8. The dual-mode projection apparatus of claim 1, wherein the communications module comprises a wireless communications module.

9. The dual-mode projection apparatus of claim 8, wherein the communications module comprises a receiver for receiving the image from the remote device.

10. The dual-mode projection apparatus of claim 1, wherein the position comprises a displacement position.

11. The dual-mode projection apparatus of claim 10, wherein the displacement position is determined with reference to a reference point in the projection surface.

12. The dual-mode projection apparatus of claim 10, wherein the displacement position is determined with reference to a previous position of the visible light spot.

13. The dual-mode projection apparatus of claim 1, wherein the remote device is selected from the list comprising: a presentation computer; a video game player; a DVD player; a digital video recorder; a set-top box; a cable receiver; a satellite receiver; an entertainment unit; a controller; and a television.

14. An optical apparatus, comprising:
a light pointer configured for emitting light of constant intensity; and
a projection apparatus for projecting an image onto a projection surface, the projection apparatus comprising:
an image sensor module for capturing images of the projection surface and determining spatial and temporal characteristics of a visible light spot superimposed on the projection surface and generated by the light pointer; and
a communications module for transmitting the spatial and temporal characteristics of the visible light spot to a remote device for remote control of the device based on the spatial and temporal characteristics of the visible light spot; wherein the spatial and temporal characteristics of the visible light spot are interpreted as a plurality of commands.

15. The optical apparatus of claim 14, wherein the projection apparatus comprises a projection module for projecting the image onto the projection surface.

16. The optical apparatus of claim 15, further comprising a calibration module for aligning the image sensor module with the projection module.

17. The optical apparatus of claim 14, wherein the image sensor module comprises an image sensor.

18. The optical apparatus of claim 17, wherein the image sensor module further comprises a processor.

19. The optical apparatus of claim 18, wherein the image sensor and the processor are mounted on separate chips.

20. The optical apparatus of claim 18, wherein the image sensor and the processor are integrated in a single chip.

21. A method for controlling a remote device with a dual-mode projection apparatus and a light pointer, comprising:
projecting a first image onto a projection surface with a projection module in the dual-mode projection apparatus;
capturing a second image of the projection surface with an image sensor module integrated into the dual-mode projection apparatus;
detecting a visible light spot of constant intensity in the second image with the image sensor module, the constant-intensity visible light spot generated by the light pointer;
determining spatial and temporal characteristics of the visible light spot with the image sensor module;
transmitting the spatial and temporal characteristics of the visible light spot to a remote device;
interpreting the spatial and temporal characteristics of the visible light spot as a plurality of commands; and
controlling the remote device based on the commands.

22. The method of claim 21, further comprising calibrating the image sensor module with the projection module.

23. The method of claim 21, further comprising mapping the position of the visible light spot to a position in the first image.

24. A device, comprising:
a projection module for projecting an image onto a projection surface;
an image sensor module for capturing images of the projection surface and determining spatial and temporal characteristics of a visible light spot of constant intensity superimposed on the projection surface; and
a control module for interpreting the spatial and temporal characteristics of the constant-intensity light spot as a plurality of commands and for controlling the device based on the commands.

25. The device of claim 24, wherein the device is selected from the list comprising: a computer; a video game player; a DVD player; a digital video recorder; a set-top box; a cable receiver; a satellite receiver; an entertainment unit; a controller; and a television.

* * * * *